United States Patent
Maruyama et al.

(10) Patent No.: US 8,208,354 B2
(45) Date of Patent: Jun. 26, 2012

(54) OPTICAL DISC APPARATUS, DRIVING METHOD OF OPTICAL DISC APPARATUS

(75) Inventors: Hideki Maruyama, Yokohama (JP); Toshiteru Nakamura, Yokohama (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/839,567

(22) Filed: Jul. 20, 2010

(65) Prior Publication Data
US 2011/0182160 A1  Jul. 28, 2011

(30) Foreign Application Priority Data
Jan. 27, 2010 (JP) ................................ 2010-014986

(51) Int. Cl.
*G11B 7/00* (2006.01)
(52) U.S. Cl. ............... 369/44.32; 369/44.27; 369/44.23; 369/44.29; 369/53.2
(58) Field of Classification Search ................ 369/53.2, 369/44.23, 44.27, 44.32, 44.29
See application file for complete search history.

(56) References Cited

U.S. PATENT DOCUMENTS

| | | | |
|---|---|---|---|
| 2005/0068860 A1* | 3/2005 | Kanou | 369/44.27 |
| 2005/0237873 A1 | 10/2005 | Maruyama et al. | |
| 2006/0280082 A1* | 12/2006 | Yasukawa | 369/53.2 |
| 2007/0070850 A1* | 3/2007 | Watanabe et al. | 369/53.22 |
| 2007/0206459 A1* | 9/2007 | Iwamoto et al. | 369/44.29 |

FOREIGN PATENT DOCUMENTS
JP  2005-332558  12/2005

* cited by examiner

*Primary Examiner* — Latanya Bibbins
(74) *Attorney, Agent, or Firm* — Antonelli, Terry, Stout & Kraus, LLP.

(57) ABSTRACT

An optical disc apparatus, for executing recording or reproducing on an optical disc having at least two recording/reproducing layers, includes an optical pickup, having a sphere aberration compensating portion, an objective lens, a driver portion, and an obtaining portion. The sphere aberration compensating portion sets up a compensation volume corresponding to an intermediate position laying between a deepest layer and a most front layer from the optical pickup, and the driver portion drives the objective lens in a direction approaching to the optical disc in accordance with the set compensation volume. When the sphere aberration compensating portion sets up the compensation volume corresponding to the deepest layer, and when the objective lens is driven in a direction approaching the optical disc, the driver portion drives the objective lens in a direction of separating from the optical disc.

22 Claims, 6 Drawing Sheets

POSITION OF SPHERE ABERRATION COMPENSATION MECHANISM

WAVEFORM OF FOCUS ERROR SIGNAL OF MULTI-LAYER OPTICAL DISC

DISC RECOGNITION FLOW

FIG. 7

ADJUSTMENT FLOW OF AMPLITUDE

```
START
  ↓
s50: MOVE SPHERE ABERRATION COMPENSATION MECHANISM TO INTERMEDIATE POSITION, OPTICAL POSITION, ON EACH LAYER
  ↓
s60: FOCUS UP SWEEP
  ↓
s61: OBTAIN AMPLITUDES OF FE SIGNAL/PE SIGNAL ON EACH LAYER
  ↓
s70: MOVE SPHERE ABERRATION COMPENSATION MECHANISM TO DEEPEST OPTICAL POSITION
  ↓
s80: FOCUS DOWN SWEEP
  ↓
s81: OBTAIN AMPLITUDES OF FE SIGNAL/PE SIGNAL ON EACH LAYER
  ↓
s90: CALCULATE AMPLITUDE ADJUSTMENT VALUE WHEN SPHERE ABERRATION COMPENSATION MECHANISM IS POSITIONED AT EACH LAYER (OPTIMAL GAIN CALCULATION)
  ↓
END
```

FIG. 8

AMPLITUDE OF FE SIGNAL/PE SIGNAL WHEN UP SWEEP

|    | AMPLITUDE VALUE AT INTERMEDIATE POSITION OF SPHERE ABERRATION |
|----|---------------------------------------------------------------|
| L3 | $FE_{3-1.5}/PE_{3-1.5}$ |
| L2 | $FE_{2-1.5}/PE_{2-1.5}$ |
| L1 | $FE_{1-1.5}/PE_{1-1.5}$ |
| L0 | $FE_{0-1.5}/PE_{0-1.5}$ |

FIG. 9

AMPLITUDE OF FE SIGNAL/PE SIGNAL WHEN DOWN SWEEP

| | AMPLITUDE VALUE AT L0 POSITION OF SPHERE ABERRATION |
|---|---|
| L3 | $FE_{3-0}/PE_{3-0}$ |
| L2 | $FE_{2-0}/PE_{2-0}$ |
| L1 | $FE_{1-0}/PE_{1-0}$ |
| L0 | $FE_{0-0}/PE_{0-0}$ |

FIG. 10

FE SIGNAL/PE SIGNAL ON EACH LAYER

| | SPHERE ABERRATION POSITION L3 | SPHERE ABERRATION POSITION L2 | SPHERE ABERRATION POSITION L1 | SPHERE ABERRATION POSITION L0 |
|---|---|---|---|---|
| L3 | $FE_{3-3}/PE_{3-3}$ | $FE_{3-2}/PE_{3-2}$ | $FE_{3-1}/PE_{3-1}$ | $FE_{3-0}/PE_{3-0}$ |
| L2 | $FE_{2-3}/PE_{2-3}$ | $FE_{2-2}/PE_{2-2}$ | $FE_{2-1}/PE_{2-1}$ | $FE_{2-0}/PE_{2-0}$ |
| L1 | $FE_{1-3}/PE_{1-3}$ | $FE_{1-2}/PE_{1-2}$ | $FE_{1-1}/PE_{1-1}$ | $FE_{1-0}/PE_{1-0}$ |
| L0 | $FE_{0-3}/PE_{0-3}$ | $FE_{0-2}/PE_{0-2}$ | $FE_{0-1}/PE_{0-1}$ | $FE_{0-0}/PE_{0-0}$ |

FIG. 11

COMPARISON OF FE SIGNAL WAVEFORM WHEN LENS SHIFT GENERATES

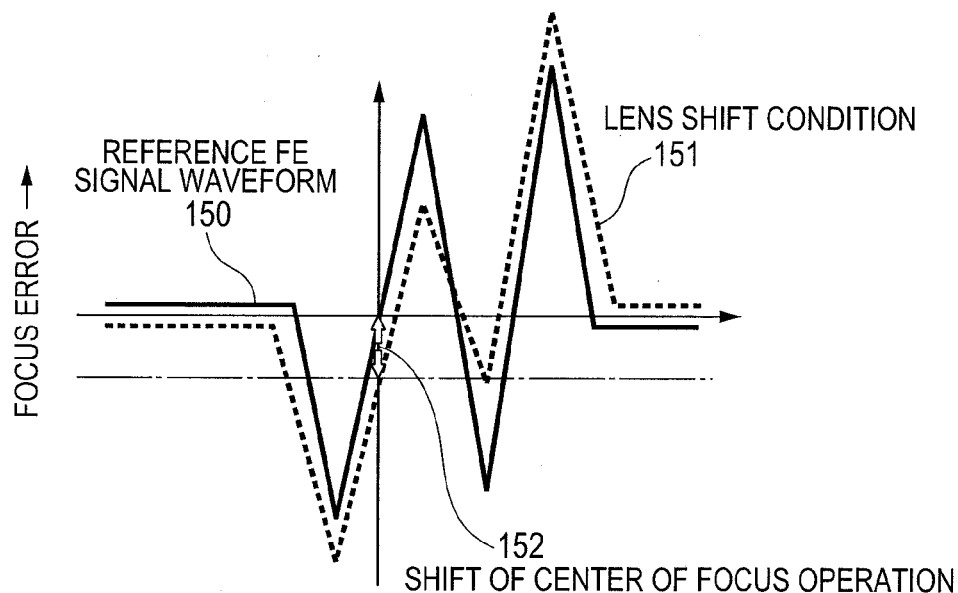

ADJUSTMENT FLOW OF CENTER OF FOCUS OPERATION

FLOW OF APPLYING ADJUSTMENT OF CENTER OF FOCUS OPERATION POINT

OPTICAL DISC APPARATUS, DRIVING METHOD OF OPTICAL DISC APPARATUS

This application relates to and claims priority from Japanese Patent Application No. 2010-014986 filed on Jan. 27, 2010, the entire disclosure of which is incorporated herein by reference.

BACKGROUND OF THE INVENTION

The present invention relates to an optical disc apparatus or a driving method of the optical disc apparatus.

As the document relating to the optical disc apparatus is published Patent Document 1. In that Patent Document 1, for example, in the abstract thereof is described "An optical disc apparatus is an apparatus of irradiates a light beam upon an information surface of a disc 1, upon the surface of which a light transmission layer is coated, and thereby conducing recording/reproducing. The optical sic apparatus comprises a sphere aberration controller portion 21 for correcting the sphere aberration generating on the light beam, in advance, a focus error detector portion 10 for detecting a focus error signal, and a controller 17 for adjusting a volume of the sphere aberration so that an amplitude of a signal of the focus error detector portion 10 has a predetermined value, after brining it to a predetermined volume with using the sphere aberration controller portion 21." Also, in a column number 0015 of that document, there are described, "For a multi-layer disc having two or more pieces of information surfaces laminated thereon, it is preferable to be so constructed that a compensation can be made on the sphere aberration or a coma aberration, for each layer, by means of an aberration compensator means" and "It is preferable that the aberration compensator means compensate the sphere aberration or the coma aberration in advance when the apparatus starts, so that the amplitude of the signal of the detector means comes to the maximum, approximately." And, with the optical disc apparatus described in that document, it is described that "An automatic amplitude control for maintaining a stable focusing and/or tracking characteristic(s) can be maintained, always, even when the sphere aberration and/or the coma aberration generate(s)" (in the abstract).

<Prior Art Documents>
<Patent Documents>
[Patent Document 1] Japanese Patent Laying-Open No. 2005-332558 (2005).

Within the optical disc apparatus, a laser beam, which is irradiated from an optical pickup directing to an optical disc, and also a reflection light from the optical disc are received upon the optical pickup, and thereby conducting recording/reproducing. According to a main regulation for the optical disc, a recording capacity increases in an order, such as, CD, DVD and BD, for example, and in particular, with DVD and BD, it has two (2) layer structures, e.g., recording/reproducing layers for increasing the recording capacity thereof, within the same disc. For the purpose of increasing the recording capacity, it becomes important with how much high accuracy the above-mentioned laser/reflection lights can be emitted/received, and recording/reproducing control thereupon can be executed upon basis of that signal. In particular, for the BD, a sphere aberration compensation mechanism is necessary as an optical compensation mechanism within an optical pickup, for the purpose of maintaining an accuracy of light emitting/receiving due to the sphere aberration. For the purpose of further increasing the memory capacity, it can be achieved by increasing a number of recording/reproducing layers, but there is necessity of a light emitting/receiving technology with high accuracy from a viewpoint of a S/N (Signal to Noise) of signal.

However, with the conventional technology, it takes a long time to adjust the signal in case of the optical disc having two (2) or more of the recording/reproducing layers, and there is remained a drawback from a viewpoint of usability for a user. For example, among processes included in an adjustment process, a process for compensating the sphere aberration takes a long time. In case when conducting the adjustment process, in particular, after compensating the sphere aberration for all of the layers, for example, a possibility that a number of times of conducting the sphere aberration comes to be large than a number of layers of the optical disc is high, and there is a passivity that it is impossible to reduce or shorten the time of the adjustment process. Also, such problem comes to be remarkable, as the number of layers of the optical disc increases.

BRIEF SUMMARY OF THE INVENTION

An object, according to the present invention, is to provide an optical disc apparatus for shortening or reducing the time for conducting the adjustment process or a driving method of such the optical disc apparatus.

The object mentioned above is accomplished by the structures described in the pending Claims, which will be mentioned later. For example, the present optical disc apparatus comprises a sphere aberration compensating unit and a driver unit. And the sphere aberration compensating unit sets an amount or volume of compensation to that corresponding to a middle position between the layer at the deepest from the pickup and the layer at the most front thereof, and the driver unit drives an objective lens in such direction that it approaches or comes close to the optical disc, when the compensation volume is set at that corresponding to the middle portion. Further, the sphere aberration compensating unit sets the compensation volume to that corresponding to the layer at the deepest, when the objective lens is driven in such direction of approaching to the optical disc, and the driver unit drives the objective lens into the direction of going away from the optical disc, when the compensation value is set at corresponding to the layer at the deepest.

Thus, according to the present invention, it is possible to provide the optical disc apparatus of reducing or shortening the time for conducting the adjustment process or a driving method of that optical disc apparatus.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 7 is a flowchart for showing an adjustment process of amplitude;

FIG. 8 is a view for showing amplitudes of FE signal/PE signal at the time of focus Up sweeping;

FIG. 9 is a view for showing amplitudes of FE signal/PE signal at the time of focus Down sweeping;

FIG. 10 is a view for showing amplitudes of FE signal/PE signal on each of layers;

FIG. 11 is a view for showing waveforms of FE signals, in comparison thereof, when lens shift occurs;

DETAILED DESCRIPTION OF THE PREFERRED EMBODIMENTS

Hereinafter, embodiments according to the present invention will be fully explained by referring to the attached drawings. And, explanation will be given on an optical disc recording/reproducing apparatus, as an example of the optical disc apparatus, hereinafter.

Figure 1:
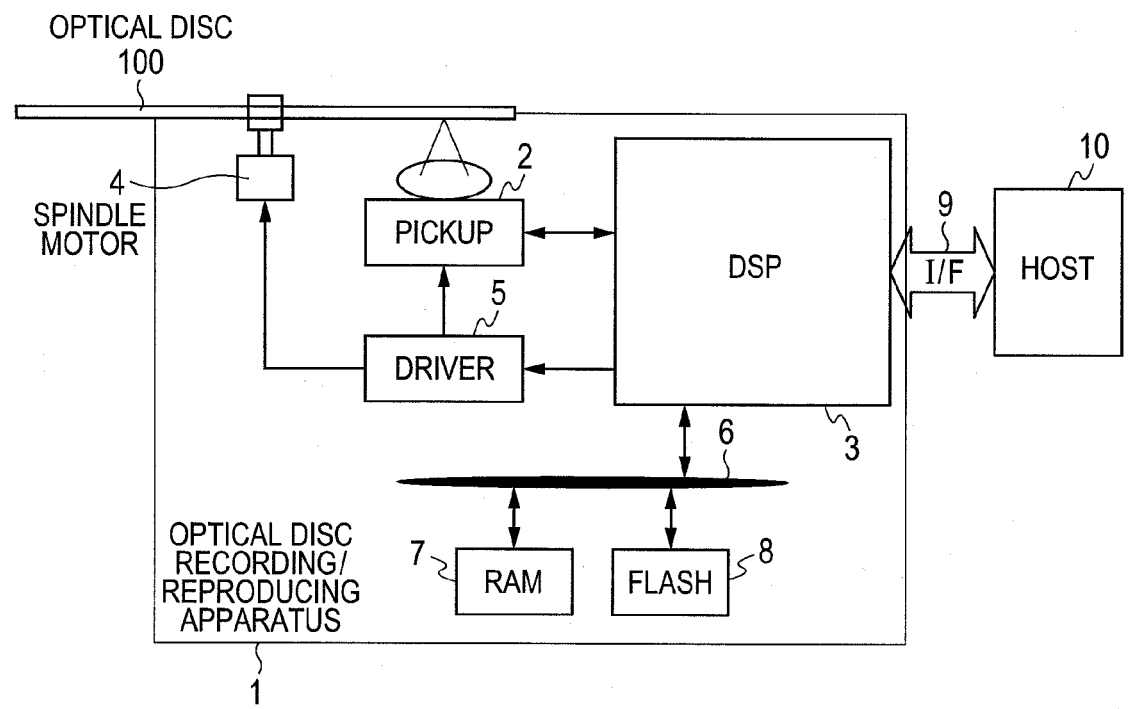
FIG. 1 is a block diagram for showing the structure of an optical disc recording/reproducing apparatus.

FIG. 1 is a block diagram for showing the structure of the optical disc recording/reproducing apparatus.

The optical disc recording/reproducing apparatus 1 comprises an optical pickup 2 therein. The optical pickup 2 irradiates a laser beam upon an optical disc 100, and it also receives a light reflecting upon the optical disc 100 by itself. The optical disc 100 is chucked on a spindle motor 4, and it is controlled by a driver 5 and a DSP 3. Also, the optical disc 100 has four (4) pieces of recording/reproducing layers or more than that. However, the recording/reproducing layer means a layer, upon/from which is conducted either recording or reproducing of user data. Also, as the recording/reproducing layer may be a layer for exclusive use of reproducing, a write-once layer or a rewritable layer, for example. The optical pickup 2 is controlled by the driver 5 and the DSP 3, in the similar manner as the motor 4. The DSP 3 includes therein a CPU not shown in the figure, and is connected with a RAM 7 and a flash memory 8 through a bus 6. Also, the DSP 3 functions as an obtaining unit for obtaining various kinds of adjustment amount or volume with respect to the optical disc. Also, in the flash memory 8 is recorded a program for use of controlling the optical disc recording/reproducing apparatus 1. The optical disc recording/reproducing apparatus 1 is connected with a host 10 of a personal computer via an external interface 9.

In FIG. 1, although the DSP 3, the driver 5, the RAM 7 and the flash memory 8 are shown in the form of separated devices, as an example, but among of those, an arbitrary combination thereof may be combined as one (1) piece of device.

Figure 2:
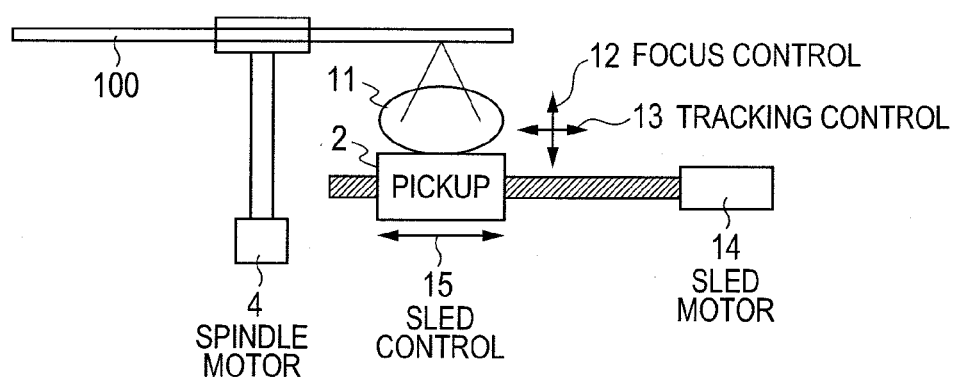
FIG. 2 is a view for showing the detailed operations of the optical pickup.

FIG. 2 is a view for showing the details of operations of the optical pickup.

On the optical pickup 2 are mounted an objective lens 11. Upon the objective lens is conducted a focus control (12) in the direction of the disc surface and a tracking control (13) of following a track, which is cut on the disc. Also, upon the optical pickup 2 is conducted a sled control (15) in the radial direction of the optical disc by means of a sled motor 14, as well as the objective lens 11.

Figure 3:
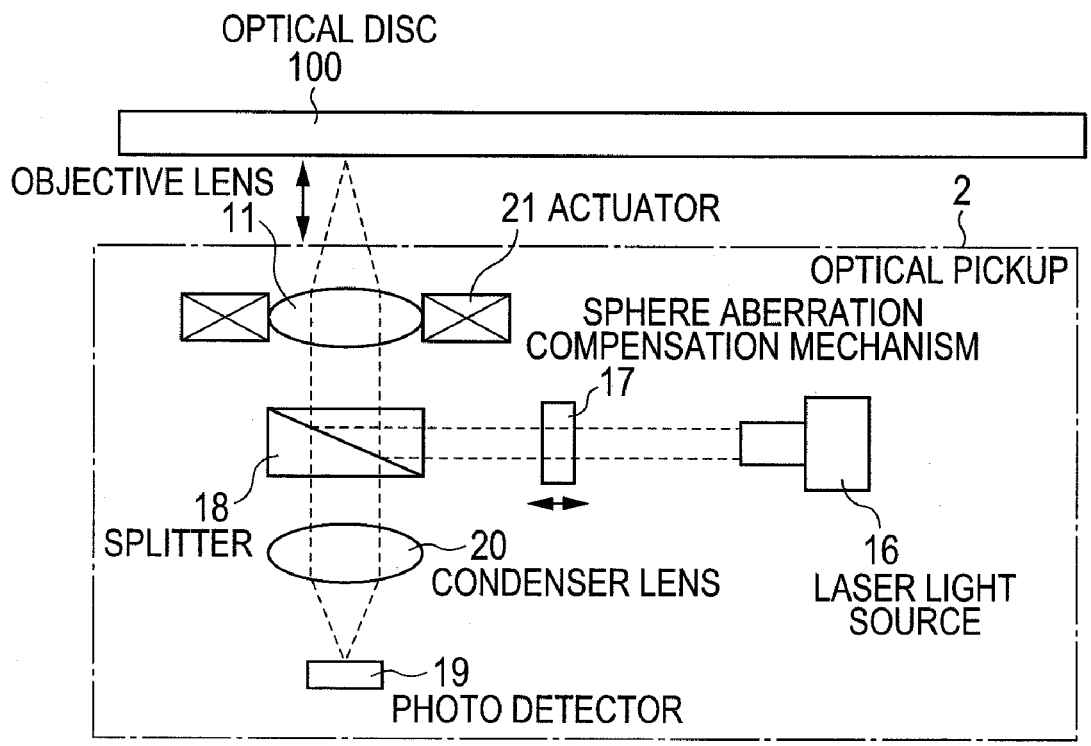
FIG. 3 is a view for showing the inner details of the optical pickup.

FIG. 3 is a view for showing the inner details of the optical pickup 2.

A laser beam is irradiated from a laser light source 16, through a sphere aberration compensating mechanism 17, and it is irradiated upon the optical disc 100 passing through the objective lens 11, via a splitter 18. Herein, the sphere aberration compensating mechanism 17 is built up with, for example, a beam expander having two (2) or more pieces of lenses, in a manner of being changeable of the distance between those lenses. The laser beam irradiated is reflected upon the optical disc 100. Also, the laser beam reflected upon the optical disc 100, in the similar manner, passes through the objective lens 11, and the lights condensed by a condensing lens 20 is received upon an optical detector 19. The lights detected upon the optical detector 19 is converted into an electric signal, and upon basis of the electric signal converted, the DSP not shown in the figure control an actuator 21 for driving the objective lens 11 of the optical pickup 2, through a driver, which is also not shown in the figure. The optical detector 19 produces a signal, which is proportional to an amount or quantity of reflection lights, a focus error signal (a FE signal), which is necessary for conducting the focus control/tracking control shown previously, a tracking error signal (a TE signal), and a signal, which is an original of an error signal of total quantity of reflection lights (a PE signal). However, the error signal of total quantity of reflection lights may be said in other words, such as, a sum signal, a total sum signal, or a total light quantity signal, for example.

Figure 4:
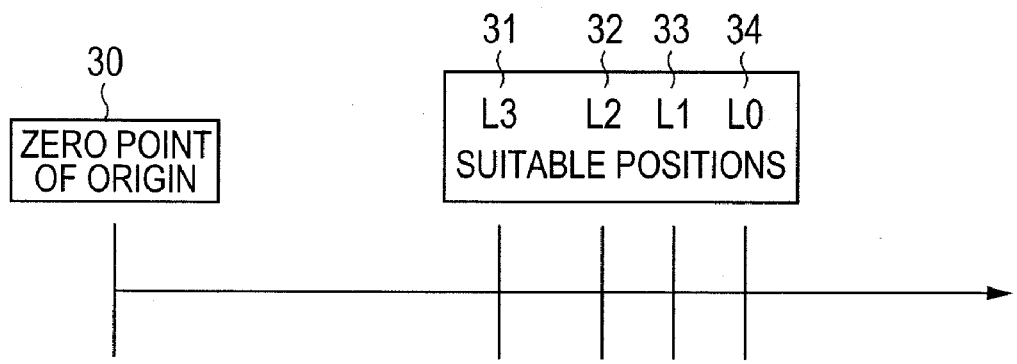
FIG. 4 is a block diagram for showing a sphere aberration compensating mechanism.

FIG. 4 is a block diagram for showing the positions of the sphere aberration compensating mechanism 17, being most suitable for each of the layers, within the sphere aberration compensating mechanism 17.

It is assumed that an end of a movable region of the sphere aberration compensating mechanism 17 is a zero (0) point of origin. Also, in case where a number of the layers of the multi-layer disc is four (4), for example, then the position 31 is most suitable for a L3 layer, the position 32 is most suitable for a L2, the position 33 is most suitable for a L1, and the position 34 is most suitable for a L0, in the order starting from the position near to the zero (0) point of origin. However, although the position of the most suitable sphere aberration compensating mechanism 17 differs from, on each of the layers, depending on non-uniformity or fluctuation of the constituent parts of the optical pickup, but a positional relationship is universal upon basis of the zero (0) point of origin. With the optical disc recording/reproducing apparatus 1, the position of the sphere aberration compensating mechanism 17 suitable for each layer is obtained, where an index of reproducing characteristics, such as, a jitter, etc., comes to the best, with using a standard multi-layer disc as a reference, in advance, and it is memorized in the flash memory 8 shown in FIG. 1. Further, for the purpose of removal of the non-uniformity on the side of the disc, an adjustment is executed for obtaining the most suitable position of the sphere aberration compensating mechanism 17 on each layer, more strictly, during a disc recognition process. However, in the present explanation of the specification, the most suitable position of the sphere aberration compensating mechanism 17 for a $N^{th}$ layer means the position of the sphere aberration compensating mechanism 17 corresponding to the $N^{th}$ layer, or it may be called in other words, the position suitable for the $N^{th}$ layer. Also, determining the position of the sphere aberration compensating mechanism 17 can be said in other words, such as, determining the compensation volume of the sphere aberration. Also, determining the position of the sphere aberration compensating mechanism 17 for the $N^{th}$ layer may be said in other words, such as, determining the compensation volume of the sphere aberration to the compensation volume corresponding to the $N^{th}$ layer, or fitting the compensation volume of the sphere aberration to the $N^{th}$ layer. Also, about the sphere aberration compensating mechanism 17, the explanation will be given on a movable lens, as an example, in the present specification, but it may be a liquid crystal element. However, it is the structure applying the movable lens therein, with which it takes a time due to the compensation volume of the sphere aberration and a remarkable effect can be obtained with the process of the present embodiment. Also, it may be so constructed that the zero (0) point of origin of the sphere aberration compensating mechanism 17 lies close to the position corresponding to the L0 layer.

Figure 5:
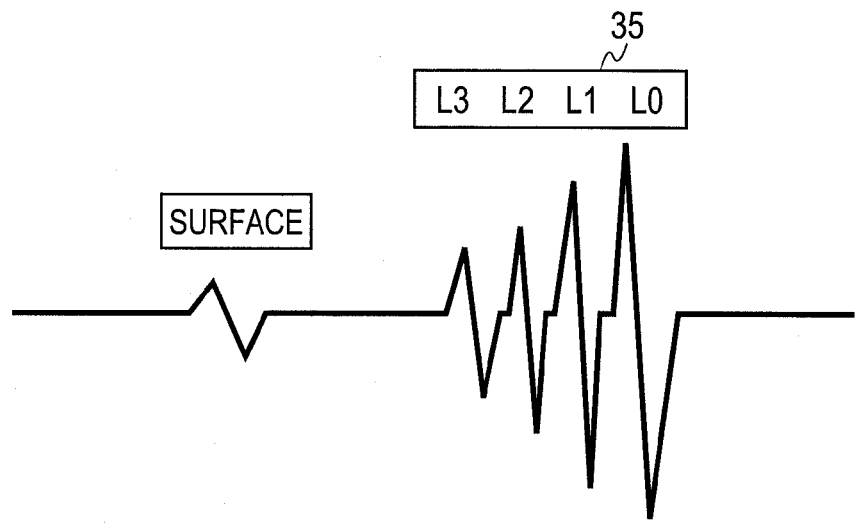
FIG. 5 is a view for showing a waveform of a focus error signal obtained from a multi-layer optical disc.

FIG. 5 is a view for showing a waveform of the FE signal on the multiple-disc when fitting the sphere aberration compensating mechanism 17 at the most suitable position, on the deepest layer (L0) 35 seeing it from the optical pickup 2.

As is shown in FIG. 5, when the objective lens 11 of the optical pickup 2 comes close to the optical disc, the FE signal obtained has amplitude thereof different from, each time when a just focus point of the laser beam passes by or comes across each of the layers. Also, due to the non-uniformity or the like between the layers of the multi-layer disc, a ratio of amplitude on each layer cannot be determined at one value, when normalizing the amplitude of the FE signal on the L0 layer to be 100%. Then, for the purpose of normalizing the amplitude of the FE signal on each layer at high accuracy, it is preferable to obtain the amplitude of the FE signal on each layer after positioning the sphere aberration compensating mechanism 17 at each layer. However, with such multi-layer (4-layer) disc as is shown in the figure, there is necessity of adjusting the amplitude of the FE signal four (4) times, after fitting the sphere aberration to all of the layers, for example, and this increases the time. However, though not shown in the figure, it is in the same or similar relationship, in amplitude of the error signal of total quantity of reflection lights. Also, no absolute position sensor is mounted on the sphere aberration compensating mechanism 17, due to the reason of a cost and a position for installation thereof within the optical pickup 2; then in many cases, it can detect only the zero (0) point of origin. In this case, in particular, when turning ON a power source of the optical disc recording/reproducing apparatus 1, since the position of the sphere aberration compensating mechanism 17 is undefined, it is necessary to detect the zero (0) point of origin. Therefore, when recognizing the disc, the sphere aberration compensating mechanism 17 must be moved to the position, which is most suitable for each layer, after detecting the zero (0) point of origin, once. In accordance with the BD regulation, since the position where the recording/reproducing should be started is determined to be the L0 layer, therefore, it is the L0 layer, upon which the focus servo should be turned ON at first within the process of recognizing the disc. Accordingly, it is necessary to set the position of the sphere aberration compensating mechanism 17 to that corresponding to the L0 layer. However, turning the focus servo to be ON indicates conducting a process of moving the focus position of the laser beam in such a manner that it follows a specific layer.

Next, explanation will be given on the disc reorganization process of the present optical disc recording/reproducing apparatus 1, with using a flowchart shown in FIG. 6. However, this process is executed by the optical disc recording/reproducing apparatus 1, under control of the DSP3, for example.

In disc reorganization process, it is necessary to check a number of layers or the like, before turning the focus servo ON. However, as was shown previously, there is an interrelation between the position of the sphere aberration compensating mechanism 17 and the amplitude of the FE signal, and between it and the amplitude of the PE signal, and therefore, if the sphere aberration compensating mechanism 17 is set to the position being most suitable for the L0 layer, then the amplitude of the FE signal and the amplitude of the PE signal of other layers are lowered down, i.e., they cannot be detected. Also, as was shown in FIG. 4, it takes a long time for the sphere aberration compensating mechanism 17 to move to the position being most suitable for the L0 layer, since it is located at the position which is mostly separated from the zero (0) point of origin.

Then, first of all, the optical disc recording/reproducing apparatus 1 shifts the sphere aberration compensating mechanism to an intermediate position between the position, which corresponds to the deepest layer, and the position, which corresponds to the most front layer, among the most suitable positions of the respective layers, seeing them from the optical pickup 2 (s50). With this, it is easy to detect the amplitude of the FE signal and the amplitude of the PE signal for each layer. However, the intermediate position is an average potion of the position corresponding to the deepest layer and the position corresponding to the most front layer, for example, but it should not be limited to this. For example, the intermediate position may be such a position that the amplitude of the FE signal and the amplitude of the PE signal can be obtained, with a degree of satisfying an accuracy necessary for the adjustment, on a plural number of the layers.

Next, the optical disc recording/reproducing apparatus 1 conducts a focus Up sweep, in such a direction that the objective lens 11 of the optical pickup 2 comes close to the optical disc (s60) However, the focus Up sweep indicates a process of driving the objective lens 11 to approach the optical disc 100. And a driving range of the focus Up sweep is assumed to be a range, within which a reproduction signal can be obtained on each of the layers of the optical disc 100, herein.

Next, the optical disc recording/reproducing apparatus 1 obtains a reproduction signal from each of the layers (s100). The reproduction signal mentioned herein includes at least one of the FE signal and the PE signal.

Next, the optical disc recording/reproducing apparatus 1, for preparation of turning ON of the focus serve, moves the sphere aberration compensating mechanism 17 to the position being most suitable for the deepest layer (s70).

Next, the optical disc recording/reproducing apparatus 1 conducts a focus Down sweep for separating the objective lens 11 of the optical pickup 2 far from the optical disc (s80). However, the focus Down sweep indicates a proves for driving the objective lens 11 in the directing separating far from the optical disc 100. Also, the driving range of the focus Down sweep should be determined in such a degree that the reproduction signal can be obtained on each of the layers of the optical disc 100.

Next, the optical disc recording/reproducing apparatus 1 obtains the reproduction signal from each of the layers (s110). The reproduction signal mentioned herein includes at least one of the FE signal and the PE signal.

Finally, the optical disc recording/reproducing apparatus 1 executes disc recognition (s120), with using the reproduction signal, which can be obtained in the processes up to s80. The disc recognition is executed by obtaining the number of the layers and/or the distance between the layers of the optical disc 100, upon basis a number of "S"-shaped waveforms and/or a distance between the "S"-shaped waveforms.

Thereafter, the optical disc recording/reproducing apparatus 1 executes other necessary adjustment process. The other necessary adjusting process includes, for example, a fine adjustment about the compensation volume or quantity of the sphere aberration on each layer. Further, when completing the fine adjustment, the optical disc recording/reproducing apparatus 1 transmits a Ready command, i.e., a command indicating that the recording or the reproducing can be made, to an apparatus of higher rank of a PC itself or a host apparatus.

Figure 6:
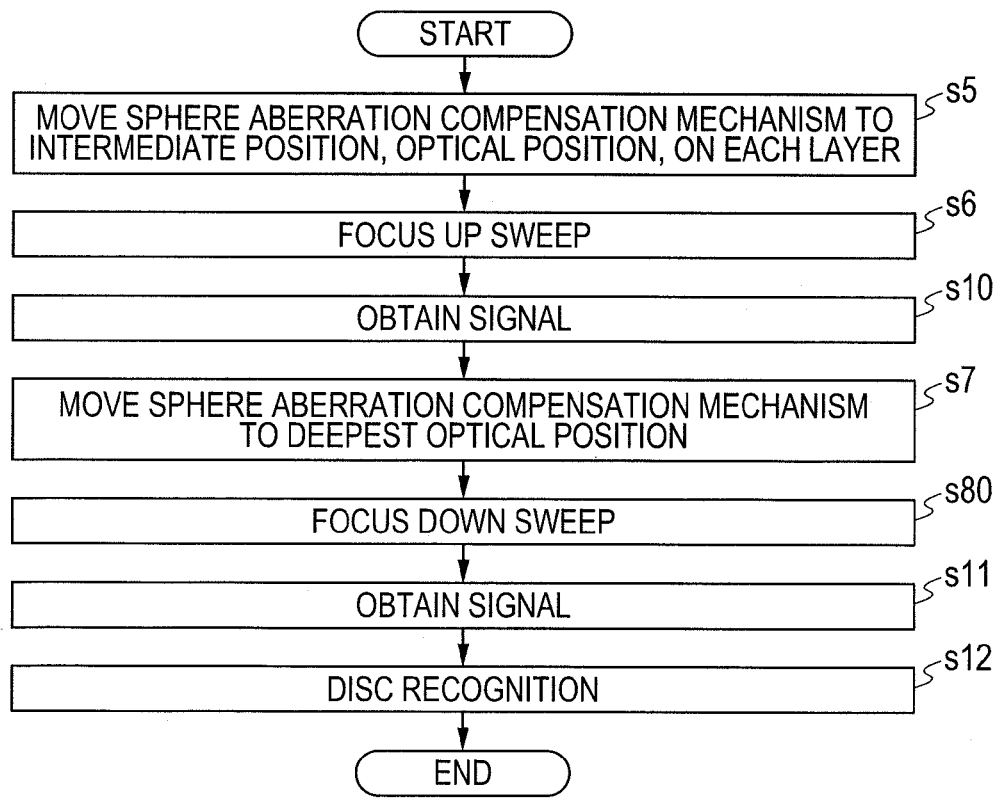
FIG. 6 is a flowchart for showing a disc recognizing process.

With the recognition process shown in FIG. 6 mentioned above, it is possible to provide a disc recognition process having high accuracy with a short time.

Also, with the process shown in FIG. 6, the optical disc recording/reproducing apparatus 1 can obtain the FE signal and the PE signal of the deepest layer, through moving the sphere aberration compensating mechanism 17 to the position corresponding to the deepest layer before executing the focus Down sweep.

However, the process shown in FIG. 6 shows an example of moving the sphere aberration compensating mechanism 17 to the position corresponding to the intermediate position, but different from this example, the optical disc recording/reproducing apparatus 1 may move the sphere aberration compensating mechanism 17 to the position corresponding to the most front layer before executing the focus Up sweep. Also, in s60, the focus Down sweep must be done in the place of the focus Up sweep, and in s80, the focus Up sweep in the place of the focus Down sweep. However, the most front layer corresponds to the L3 layer in case where the optical disc 100 has four (4) layers. With this, it is possible to obtain the FE signal and the PE signal of the most front layer, with the highest accuracy. In this case, since the movement of the sphere aberration compensating mechanism 17 at first time is a movement to the position corresponding to the most front layer from the zero (0) point of origin, and this can be taken in the shortest time, as was explained previously, it is possible to provide the disc recognizing process or the adjustment process, with the short time and at high accuracy.

Next, explanation will be given on the adjustment process on the amplitude, with using the flowchart shown in FIG. 7. However, the optical disc recording/reproducing apparatus 1 executes that process, for example, under the control of the DSP 3.

Firstly, the optical disc recording/reproducing apparatus 1 moves the sphere aberration compensating mechanism 17 to the intermediate position among the most suitable positions of the respective layers (s50). With the process of s50, it is possible to detect, easily, the amplitudes of the FE signal and the PE signal for each of the layers.

Next, the optical disc recording/reproducing apparatus 1 executes the focus Up sweep in the direction for approaching the objective lens 11 of the optical pickup 2 close to the optical disc (s60).

And, the optical disc recording/reproducing apparatus 1 obtains the amplitudes of the FE signal and the PE signal for each of the layers, during when it executes the focus Up sweep (s61). In this instance, the signal amplitude to be obtained may be both the amplitudes of the FE signal and the PE signal, or may be either one thereof.

Next, the optical disc recording/reproducing apparatus 1 moves the sphere aberration compensating mechanism 17 to the position most suitable for the deepest layer, for preparation of turning ON of the focus servo (s70).

When executing the focus Down sweep (s80), the amplitudes of the FE signal and the PE signal are obtained for each of the layers (s81). In this instance, the signal amplitude to be obtained may be both the amplitudes of the FE signal and the PE signal, or may be either one thereof. Also, in case where s81 is executed, the optical disc recording/reproducing apparatus 1 obtains a gain, which is most suitable on each of the layers.

Thereafter, the optical disc recording/reproducing apparatus 1 executes other necessary adjustment process. The other necessary adjusting process includes, for example, the fine adjustment about the compensation volume or quantity of the sphere aberration on each layer. Further, when completing the fine adjustment, the optical disc recording/reproducing apparatus 1 transmits the Ready command, i.e., the command indicating that the recording or the reproducing can be made, to an apparatus of higher rank of the PC itself or the host apparatus.

In this manner, within the process shown in FIG. 7, the process for shifting the sphere aberration compensating mechanism 17 to the position, which corresponds to the deepest layer, is executed after the process for obtaining the amplitudes. With doing this, there is no necessity of shifting the position of the sphere aberration compensating mechanism 17, for the purpose of turning the focus servo ON upon the L0 at the deepest after adjusting the amplitude, and therefore it is possible to turn the focus servo ON with short time and with stability.

However, although the description is made on the case where the focus servo is turned ON at the L0 layer at the deepest, in the processes mentioned above, the process (s70) for moving the sphere aberration compensating mechanism 17 to the position corresponding to the deepest layer in the process for adjusting the amplitude may be changed to a process for moving the sphere aberration compensating mechanism 17 to the most front layer, and the focus servo may be ON upon the most front layer. Thus, it is enough to determine a second setup position of the sphere aberration compensating mechanism 17 in the process for adjusting the amplitude to a position, which is suitable for the layer where the focus servo should be turned ON. In this case, in s60, in the place of the focus Up sweep, the focus Down sweep is conducted, and in s80, in the place of the focus Down sweep, the focus Up sweep is conducted. However, the second setup position indicates a setup position of the sphere aberration compensating mechanism 17 where it is setup after a first time focus sweep from starting the process but before the focus sweep at a second time. In this case, comparing to the process shown in FIG. 7, since a volume or quantity of changing the sphere aberration compensating mechanism 17, after starting the process up to the time for turning the focus servo ON, comes to be small; therefore it is possible to shorten the time for processing. Other than that, the second setup position may be a position differing from the first setup position, but not the layer upon which the focus servo is turned ON. If the second setup position differs from the second setup position, since the reproduction signals can be obtained for plural numbers of the setup positions, it is possible to calculate an influence upon the compensation quantity of the sphere compensation for the reproduction signal. Also, in the example given in the above, the focus sweep at the first time is the focus Up sweep, and the focus sweep at the second time is the focus Down sweep; however, it is possible to suppress the number of times of compensating the sphere aberration, even if those are executed in an arbitrary one of the directions.

As was mentioned above, the present optical disc recording/reproducing apparatus 1 executes the adjustment process upon the optical disc, which has a plural number of the layers thereof. In more details, the optical disc recording/reproducing apparatus 1 fits the sphere aberration compensating mechanism 17 to first setup position before executing the focus sweep at the first time, and after the focus sweep at the first time, and also before executing the focus sweep at the second time, it is fit to the second setup position. The first setup position is assumed to be a position, from where the amplitude can be obtained in such a degree that accuracy of gain adjustment can be maintained for each of the layers, for example. As an example of the first setup position, it is the intermediate position. The second setup position is determined at the position differing from the first setup position, for example. With this, it is possible to calculate the influence upon the compensation quantity of the sphere compensation for the reproduction signal. Further mentioning more details thereof, the second setup position may be a position corresponding to a specific layer. With this, there is no necessity of changing the compensation volume of the sphere aberration compensating mechanism 17 until the focus servo is turned ON upon that specific layer after completion of the adjustment, and therefore it is possible to shorten the time for processing. And, with this, it is also possible to improve the accuracy of gain, which can be obtained on the specific layer.

Next, FIG. 8 shows therein the amplitudes of the FE signal/PE signal obtained when executing the focus Up sweep within the flows shown FIG. 7. Herein, it is assumed that a four (4) layers disc is applied as the multi-layer disc, and since the position of the sphere aberration compensating mechanism 17, being most suitable for each layer, i.e., the intermediate position is in a middle between the L2 layer and the L1 layer; therefore, a subscript or suffix thereof is "−1.5". However, in FIG. 8 or 10, $FE_{X-Y}$ indicates amplitude of the focus error signal when a focus point of the laser beam is fitted to an $X^{th}$ layer, assuming that the sphere aberration compensating mechanism 17 is the position corresponding to a $Y^{th}$ layer. And, it is also same to $PE_{X-Y}$.

Also, FIG. 9 shows therein the amplitudes of the FE signal/PE signal obtained when executing the focus Down sweep within the flows shown FIG. 7. Herein, it is also assumed that a four (4) layers disc is applied as the multi-layer disc, in the similar manner, and since the position of the sphere aberration compensating mechanism 17, being most suitable for the layer at the deepest is L0 layer, therefore, a subscript or suffix thereof is "−0".

Also, FIG. 10 shows therein the amplitudes of the FE signal/PE signal on each layer. And in that figure, a list of the amplitudes of the FE signal/PE signal can be obtained upon basis of the tables shown in FIGS. 8 and 9. In more details thereof, from the positions of the sphere aberration compensating mechanism 17 and the amplitudes of the FE signal/PE signal obtained, which are shown in FIGS. 8 and 9, a relationship between the amplitudes of the FE signal/PE signal and the position of the sphere aberration compensating mechanism 17 can be obtained. Hereinafter, explanation will be given on the details thereof.

Herein, as an example, explanation will be given on the amplitude of the FE signal on the L0 layer. Comparing to the amplitude $FE_{0-0}$ of the FE signal obtained by the sphere aberration compensating mechanism 17 at the position corresponding to the L0 layer, the sphere aberration compensating mechanism 17 obtains the amplitude $FE_{0-1.5}$ of the FE signal at the intermediate position. Therefore, from a value $FE_{0-0}$-$FE_{0-1.5}$ can be obtained the influence, which the changing volume or quantity of the position of the sphere aberration compensating mechanism affects upon the amplitude of the FE signal. Then, for example, then $FE_{0-1}$, $FE_{0-2}$, $FE_{0-3}$, assuming that the influence of change of the compensation volume of the sphere aberration has linearity, can be obtained upon calculation thereof.

Conducting this calculation on each layer, at the position of each sphere aberration compensating mechanism, the amplitudes of the FE signal/PE signal can be obtained for each layer, as is shown in FIG. 10. From the amplitudes of the signals obtained is calculated a gain necessary for normalization, so as to set up the gain in the DSP 3 shown in FIG. 1, it is possible to obtain a gain under each condition (s90 in FIG. 7) for obtaining a constant amplitude normalized, irrespective of the layer and the position of the sphere aberration compensating mechanism 17. Also, with the $FE_{0-0}$ relating to the L0 layer, on which the focus servo is turned ON at first, during the process of the disc recognition, since it is not obtainable through the calculation, but is the amplitude when the sphere aberration compensating mechanism 17 is set to the position most suitable for the L0 layer, it is possible to obtain a gain being high in the accuracy thereof. However, the explanation was given about the amplitude of the FE signal, but also the amplitude of the PE can be obtained in the similar manner. Also, not setting the sphere aberration compensating mechanism 17 at the intermediate position, i.e., the most suitable position for each layer, but for the purpose of shortening the time much more, as was shown in FIG. 4, it may be also achieved by setting it at the position being suitable for the L3 layer.

As was explained in the above, with the adjusting method of the FE signal amplitude/PE signal amplitude, according to the present embodiment, the position of the sphere aberration compensating mechanism 17 when obtaining the FE signal amplitude/PE signal amplitude and the FE signal amplitude/PE signal amplitude are obtained through the calculations. In other words, it can be said that the optical disc recording/reproducing apparatus 1 comprises the structures for obtaining the gain for each layer, upon basis of the signal amplitudes on the respective layers, which can be obtained when the sphere aberration compensating mechanism 17 is fitted to the first setup position and the second setup position. For this reason, with the adjustment method conventionally applied, the EP signal amplitude/PE signal amplitude result into abnormal values, when the sphere aberration compensating mechanism 17 is located at an erroneous position in the positioning thereof to the specific layer. However, with the optical disc recording/reproducing apparatus 1 according to the present embodiment, there is no necessity of positioning the sphere aberration compensating mechanism 17 to all of the layers, therefore it is possible to reduce or lower the possibility of obtaining the abnormal values upon basis of the erroneous positioning of the sphere aberration compensating mechanism 17. Also, with the conventional adjustment method, there is a possibility that the FE signal amplitude/PE signal amplitude only on a specific layer result into the abnormal values, when a dirt, such as, a fingerprint or the like, adheres on the radial position of the disc, where the FE signal amplitude/PE signal amplitude are obtained from. However, with the optical disc recording/reproducing apparatus 1 according to the present embodiment, there is no necessity of obtaining the FE signal amplitude/PE signal amplitude on all of the layers, then it is possible to reduce the possibility of obtaining the abnormal values.

Also, the gain on each layer gives an influence upon the position of a just focus point on each layer, which the optical disc recording/reproducing apparatus 1 detects, and/or the compensation volume, which can be obtained through finely adjusting the sphere aberration. Also, with the optical disc recording/reproducing apparatus 1, gains on the layers other than the first setup position and the second setup position, upon basis of the signal amplitudes, which can be obtained at the first setup position and the second setup position. Accordingly, the optical disc recording/reproducing apparatus 1 obtains the position of the just focus point on the layer other than the first setup position and the second setup position, and/or the compensation volume, which can be obtained through the fine adjustment of the sphere aberration, and executes the recording or the reproducing with that compensation volume. And, with the optical disc recording/reproducing apparatus 1, it is possible to shorten the processing time up to when obtaining the signal amplitudes, which are necessary for obtaining the adjustment volume or quantity for each layer.

However, although the explanation was made on the example of the case where the optical disc 100 has four (4) layers, in the above, but it is also possible to apply the optical disc recording/reproducing apparatus 1 into cases where the optical disc 100 has 5 layers or more, for example, having 8 layers. In such case, as was in the example mentioned above, in addition to the process for fitting the sphere aberration compensating mechanism 17 at the intermediate position between L2 and L1, the structure may be made so as to execute the process for fitting the sphere aberration compensating mechanism 17 at the intermediate position between L6 and L5. Thus, the present optical disc recording/reproducing apparatus 1 does not fit the sphere aberration compensating mechanism 17 to all of the layers, but executes the adjustment process while fitting the sphere aberration compensating mechanism 17 at an intermediate position between a certain layer and other layer. With doing this, it is possible to provide the optical disc recording/reproducing apparatus 1 for suppressing an increase of the processing time, while maintaining the accuracy of adjustment, even for an optical disc having a number of layers more than four (4) layers.

Heretofore, the explanation was given about the relationship between the sphere aberration compensating mechanism 17 and the FE signal amplitude and the PE signal amplitude; however, it is already known that an absolute position of the objective lens 11 in the disc radial direction (i.e., a lens shift) by means of the tracking control 13 shown in FIG. 2 gives an influence upon the FE signal.

Herein, explanation will be given on the waveform of the FE signal when executing the focus Up sweep, while generating the lens shift.

Solid lines in FIG. 11 depict the FE signal 150 as a reference, and broken lines the FE signal 151 under the condition of the lens shift. As is shown in the figure, it can be seen that the FE signal under the lens shift condition generates a shift 152 from a reference center of focus operation, with respect to the FE signal 150 to be the reference. Since this shift volume is generated because of the optical pickup and/or the optical disc, it is necessary to obtain a volume of the lens shift during the process of the disc recognition and a volume of shift of a center of the focus operation generated, thereby to amend them within the DSP 3 shown in FIG. 1. However, the volume of the lens shift indicates a shift volume in the radial direction between a neutral position and the objective lens 11 within the optical pickup. In order to obtain the shift volume of the center of the focus operation within a specific lens shift volume, it is necessary to obtain the shift volume of the center of the focus operation in the lens shift volume in the direction of a disc outer periphery and the shift volume of the center of the focus operation in the lens shift volume in the direction of a disc inner periphery by two (2) times. However, if obtaining the shift volumes two (2) times, it takes a long time for the processing thereof, if upper/lower sweeps are repeated by two (2) times. On the contrary tot this, the optical disc recording/reproducing apparatus 1, according to the present embodiment, shorten the time for adjusting the center of the focus operation, by executing the process, which will be shown hereinafter.

Next, explanting will be given on the adjustment process of the center of the focus operation, with using a flowchart shown in FIG. 12. However, the optical disc recording/reproducing apparatus 1 executes that process, under the control of the DSP 3, for example.

First of all, the optical disc recording/reproducing apparatus 1 executes the lens shift into the direction of the disc outer periphery (s51).

Next, the optical disc recording/reproducing apparatus 1 executes the focus Up sweep in the direction for approaching the objective lens 11 of the optical pickup 2 close to the optical disc (s60).

Also, the optical disc recording/reproducing apparatus 1 obtains the shift volume of the center of the focus operation for each layer, when executing the focus Up sweep (s62).

Next, the optical disc recording/reproducing apparatus 1 executes the lens shift in the direction of the disc inner periphery (s71). It also executes the focus Down sweep (s80). Also, accompanying s80, the optical disc recording/reproducing apparatus 1 obtains the shift volume of the center of the focus operation for each layer (s82).

Next, the optical disc recording/reproducing apparatus 1 obtain the lens shift volume through calculation, from the shift volume of the center of the focus operation, which is obtained in the direction of the disc outer periphery, and the shift volume of the center of the focus operation, which is obtained in the direction of the disc inner periphery, in such a manner that the shift volume of the center of the focus operation comes to zero (0), assuming that the relationship between the lens shift volume and the shift volume of the center of the focus operation is linear (s91).

Figure 13:
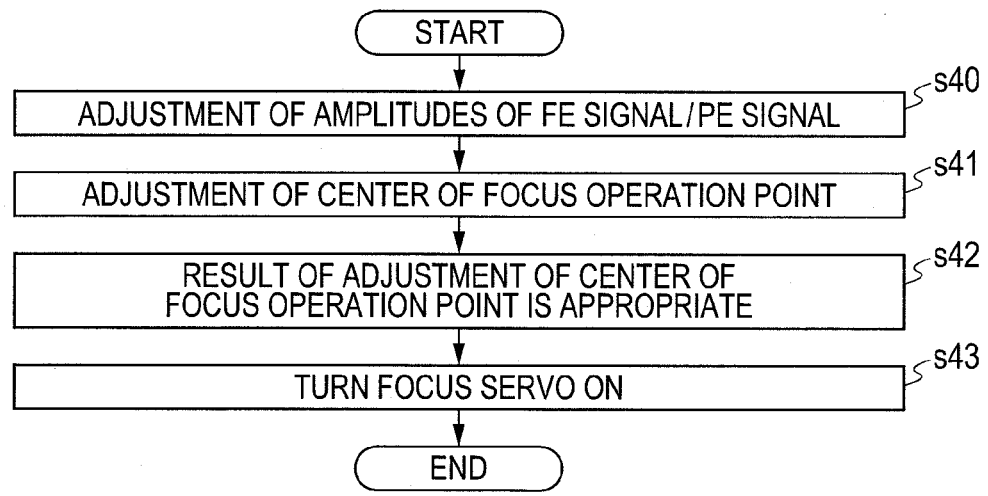
FIG. 13 is a flowchart for showing an applying process of the adjustment mainly upon a focus operation.

Following the above, explanation will be given on a method of applying a result of adjusting the center of the focus operation obtained, by referring to a flowchart shown in FIG. 13. However, the optical disc recording/reproducing apparatus 1 executes that process, for example, under the control of the DSP 3.

First of all, the optical disc recording/reproducing apparatus 1 executes the adjustment of the FE signal/PE signal shown in FIG. 7 (s40).

Figure 12:
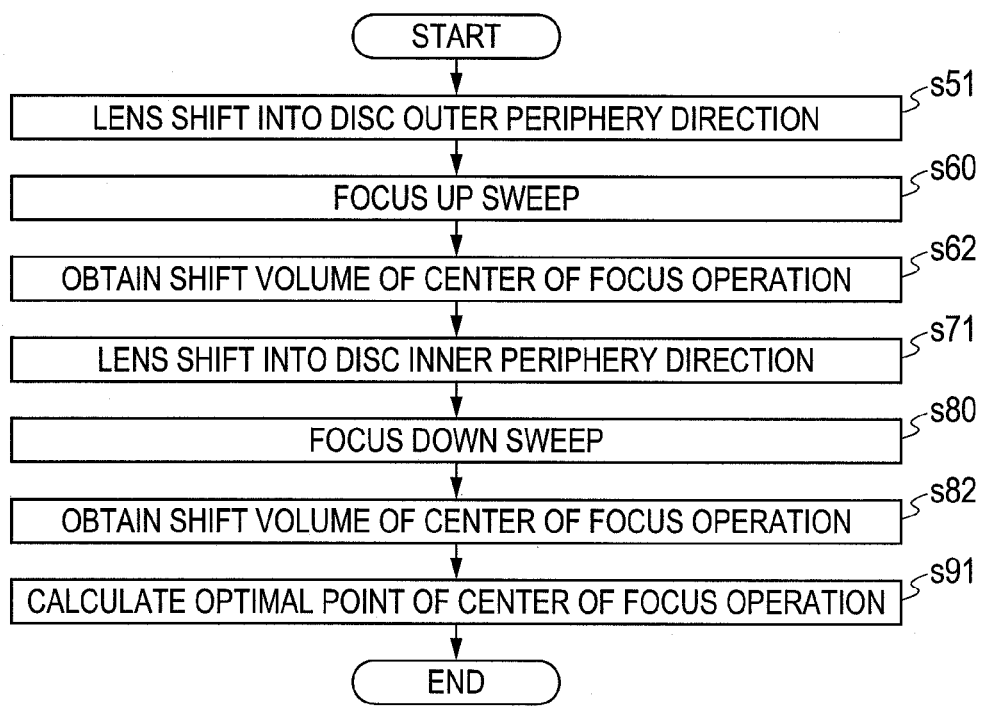
FIG. 12 is a flowchart for showing an adjustment process mainly upon a focus operation.

Next, the optical disc recording/reproducing apparatus 1 executes the adjustment of the center of the focus operation point shown in FIG. 12 (s41). It applies a result of the adjustment of the center of the focus operation point obtained (s42). As a result thereof, the reference FE signal 150 shown in FIG. 11 can be obtained; since there is no shift of the center of the focus operation, the focus control can be made equally with respect to the center of the operation, and thereby increasing stability.

Next, the optical disc recording/reproducing apparatus 1 turns the focus servo ON under this condition (s43).

However, the present invention should not be limited to the embodiments mentioned above, but may include various variations. For example, the embodiments mentioned above are explained in the details thereof, for the purpose of explaining the present invention to be easily understood, and should not be restricted to those comprising all of the constituent elements explained therein. Also, it is possible to replace a part of the structure of a certain embodiment with the constituent element of other embodiment, or it is also possible to add the constituent element of other embodiment to the structure of a certain embodiment. Also, with a part of the structure of each embodiment, it is possible to add/delete/replace with other constituent element(s).

Also, each of the constituent elements mentioned above may be constructed with hardware, in a part or all thereof, of may be achieved by executing it, by means of a processor with an aid of program. Also, control lines and/or information lines are shown, as far as considered to be necessary for the purpose of explanation, and therefore it is not necessary true that all of the control lines and/or the information lines are therein, from a viewpoint of the product. In actual, it can be considered that almost all constituent elements are connected with, mutually.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disc apparatus, for executing recording or reproducing on an optical disc having at least two (2) recording/reproducing layers, comprising:
    an optical pickup, having:
    a sphere aberration compensating portion, which is configured to set up a compensation volume of the sphere aberration;
    an objective lens;
    a driver portion, which is configured to drive said objective lens; and
    an obtaining portion, which is configured to obtain a gain for a reproduction signal; wherein
    said sphere aberration compensating portion sets up said compensation volume to a compensation volume corresponding to an intermediate position laying between a deepest layer and a most front layer from said optical pickup;
    said driver portion drives said objective lens in a direction of approaching to said optical disc, when said compensation volume is set at a compensation volume corresponding to said intermediate position;
    said sphere aberration compensating portion sets up said compensation volume at a compensation volume corresponding to said deepest layer, when said objective lens is driven in a direction of approaching to said optical disc;
    said driver portion drives said objective lens in a direction of separating from said optical disc, when said compensation volume is set to the compensation volume corresponding to said deepest layer; and
    said obtaining portion obtains a gain for said reproduction signal on each layer of said optical disc, upon basis of amplitude of said reproduction signal, which is obtained when approaching said optical pickup to said optical disc, and amplitude of said reproduction signal, which is obtained when separating said optical pickup from said optical disc.

2. The optical disc apparatus, as is described in the claim 1, wherein said reproduction signal is either a focus error signal or a total light quantity signal, or includes both of them.

3. The optical disc apparatus, as is described in the claim 1, wherein said sphere aberration compensating portion set said compensation volume at a compensation volume corresponding to an intermediate position between the deepest layer and the most front layer from said pickup, before executing recording or reproducing upon said optical disc.

4. The optical disc apparatus, as is described in the claim 1, wherein said sphere aberration compensating portion set said compensation volume at a compensation volume corresponding to an intermediate position between the deepest layer and the most front layer from said pickup, during recognition process of said optical disc.

5. The optical disc apparatus, as is described in the claim 1, wherein said optical disc has four (4) layers, a L0 layer, a L1 layer, a L2 layer, and a L3 layer, and
    said intermediate position is a position laying between the L1 layer and the L2 layer.

6. An optical disc apparatus, for executing recording or reproducing on an optical disc having at least two (2) recording/reproducing layers, comprising:
    an optical pickup, having:
    a sphere aberration compensating portion, which is configured to set up a compensation volume of the sphere aberration;
    an objective lens;
    a driver portion, which is configured to drive said objective lens;
    an obtaining portion, which is configured to obtain a gain for a reproduction signal; wherein
    said sphere aberration compensating portion sets up said compensation volume to that corresponding to an intermediate position laying between a deepest layer and a most front layer from said optical pickup;
    said driver portion drives said objective lens in a direction of separating from said optical disc, when said compensation volume is set at a compensation volume corresponding to said intermediate position;
    said sphere aberration compensating portion sets up said compensation volume at a compensation volume corresponding to said most front layer, when said objective lens is driven in a direction of separating from said optical disc;
    said driver portion drives said objective lens in a direction approaching to said optical disc, when said compensation volume is set at the compensation volume corresponding to said most front layer; and
    said obtaining portion obtains a gain for said reproduction signal on each layer of said optical disc, upon basis of amplitude of said reproduction signal, which is obtained when approaching said optical pickup to said optical disc, and amplitude of said reproduction signal, which is obtained when separating said optical pickup from said optical disc.

7. The optical disc apparatus, as is described in the claim 6, wherein said reproduction signal is either a focus error signal or a total light quantity signal, or includes both of them.

8. The optical disc apparatus, as is described in the claim 6, wherein said sphere aberration compensating portion set said compensation volume at a compensation volume corresponding to an intermediate position between the deepest layer and the most front layer from said pickup, before executing recording or reproducing upon said optical disc.

9. The optical disc apparatus, as is described in the claim 6, wherein said sphere aberration compensating portion set said compensation volume at a compensation volume corresponding to the intermediate position between the deepest layer and the most front layer from said pickup, during recognition process of said optical disc.

10. The optical disc apparatus, as is described in the claim 6, wherein said optical disc has four (4) layers, a L0 layer, a L1 layer, a L2 layer, and a L3 layer, and
    said intermediate position is a position laying between the L1 layer and the L2 layer.

11. An optical disc apparatus, for executing recording or reproducing on an optical disc having at least two (2) recording/reproducing layers, comprising:
    an optical pickup, having:
    a sphere aberration compensating portion, which is configured to set up a compensation volume of the sphere aberration;
    an objective lens; and a driver portion, which is configured to drive said objective lens; wherein said sphere aberration compensating portion sets up said compensation volume to a compensation volume corresponding to an intermediate position laying between a deepest layer and a most front layer from said optical pickup;

said driver portion drives said objective lens in a direction of approaching to said optical disc, when said compensation volume is set at a compensation volume corresponding to said intermediate position;

said sphere aberration compensating portion sets up said compensation volume at a compensation volume corresponding to said deepest layer, when said objective lens is driven in a direction of approaching to said optical disc;

said driver portion drives said objective lens in a direction of separating from said optical disc, when said compensation volume is set to the compensation volume corresponding to said deepest layer; and recording or reproducing is executed onto/from each layer of said optical disc, depending on the compensation volume of the sphere aberration or a focus position, which can be obtained upon basis of the amplitude of said reproduction signal obtained when approaching said optical pickup to said optical disc, and the amplitude of said reproduction signal obtained when separating said optical pickup from said optical disc.

12. The optical disc apparatus, as is described in the claim 11, wherein said reproduction signal is either a focus error signal or a total light quantity signal, or includes both of them.

13. The optical disc apparatus, as is described in the claim 11, wherein said sphere aberration compensating portion set said compensation volume at a compensation volume corresponding to an intermediate position between the deepest layer and the most front layer from said pickup, before executing recording or reproducing upon said optical disc.

14. The optical disc apparatus, as is described in the claim 11, wherein said sphere aberration compensating portion set said compensation volume at a compensation volume corresponding to an intermediate position between the deepest layer and the most front layer from said pickup, during recognition process of said optical disc.

15. The optical disc apparatus, as is described in the claim 11, wherein said optical disc has four (4) layers, a L0 layer, a L1 layer, a L2 layer, and a L3 layer, and said intermediate position is a position laying between the L1 layer and the L2 layer.

16. An optical disc apparatus, for executing recording or reproducing on an optical disc having at least two (2) or more of recording/reproducing layers, comprising:

an optical pickup, having:

a sphere aberration compensating portion, which is configured to set up a compensation volume of the sphere aberration;

an objective lens; and a driver portion, which is configured to drive said objective lens; wherein said sphere aberration compensating portion sets up said compensation volume to that corresponding to an intermediate position laying between a deepest layer and a most front layer from said optical pickup;

said driver portion drives said objective lens in a direction of separating from said optical disc, when said compensation volume is set at a compensation volume corresponding to said intermediate position;

said sphere aberration compensating portion sets up said compensation volume at a compensation volume corresponding to said most front layer, when said objective lens is driven in a direction of separating from said optical disc;

said driver portion drives said objective lens in a direction approaching to said optical disc, when said compensation volume is set at the compensation volume corresponding to said most front layer; and recording or reproducing is executed onto/from each layer of said optical disc, depending on the compensation volume of the sphere aberration or a focus position, which can be obtained upon basis of the amplitude of said reproduction signal obtained when approaching said optical pickup to said optical disc, and the amplitude of said reproduction signal obtained when separating said optical pickup from said optical disc.

17. The optical disc apparatus, as is described in the claim 16, wherein said reproduction signal is either a focus error signal or a total light quantity signal, or includes both of them.

18. The optical disc apparatus, as is described in the claim 16, wherein said sphere aberration compensating portion set said compensation volume at a compensation volume corresponding to an intermediate position between the deepest layer and the most front layer from said pickup, before executing recording or reproducing upon said optical disc.

19. The optical disc apparatus, as is described in the claim 16, wherein said sphere aberration compensating portion set said compensation volume at a compensation volume corresponding to the intermediate position between the deepest layer and the most front layer from said pickup, during recognition process of said optical disc.

20. The optical disc apparatus, as is described in the claim 16, wherein said optical disc has four (4) layers, a L0 layer, a L1 layer, a L2 layer, and a L3 layer, and said intermediate position is a position laying between the L1 layer and the L2 layer.

21. An optical disc apparatus, for executing recording or reproducing on an optical disc having at least two (2) recording/reproducing layers, comprising:

an optical pickup, having:

an objective lens;

a driver portion, which is configured to drive said objective lens into a radial direction of the optical pickup and a focus direction; and an obtaining portion, which is configured to obtain a gain for a reproduction signal; wherein said driver portion drives said objective lens into a first direction, being a disc outer periphery direction or a disc inner periphery direction, and at the first radial direction drives said objective lens into a direction of approaching to said optical disc, and it also drives said objective lens into a second direction, being opposite to said first direction, and at the second radial direction drives said objective lens into a direction of separating from said optical disc; and said obtaining portion obtains the gain for said reproduction signal for each of layers of said optical disc, upon basis of amplitude of said reproduction signal, which is obtained when approaching said optical pickup to said optical discs, and amplitude of said reproduction signal, which is obtained when separating said optical pickup from said optical disc.

22. An optical disc apparatus, for executing recording or reproducing on an optical disc having at least two (2) recording/reproducing layers, comprising:

an optical pickup, having:
an objective lens;
a driver portion, which is configured to drive said objective lens into a radial direction of the optical pickup and a focus direction; and
an obtaining portion, which is configured to obtain a lens shift volume or a central position of focus operation; wherein
said driver portion drives said objective lens into a first direction, being a disc outer periphery direction or a disc inner periphery direction, and at the first radial direction drives said objective lens into a direction of approaching to said optical disc, and it also drives said objective lens into a second direction, being opposite to said first direction, and at the second radial direction drives said objective lens into a direction of separating from said optical disc; and
said obtaining portion obtains the lens shift volume or the central position of focus operation, upon basis of amplitude of said reproduction signal, which is obtained when approaching said optical pickup to said optical discs, and amplitude of said reproduction signal, which is obtained when separating said optical pickup from said optical disc.

* * * * *